United States Patent
Kawamura et al.

(10) Patent No.: US 6,803,389 B2
(45) Date of Patent: Oct. 12, 2004

(54) PROCESS FOR PRODUCING POLYESTER RESIN

(75) Inventors: Chicara Kawamura, Hiratsuka (JP); Isamu Takabayashi, Yokohama (JP)

(73) Assignee: Kansai Paint Co., Ltd., Hyogo-ken (JP)

(*) Notice: Subject to any disclaimer, the term of this patent is extended or adjusted under 35 U.S.C. 154(b) by 159 days.

(21) Appl. No.: 09/927,328

(22) Filed: Aug. 13, 2001

(65) Prior Publication Data
US 2002/0061933 A1 May 23, 2002

(30) Foreign Application Priority Data

Sep. 6, 2000 (JP) .......... 2000-270216
Mar. 2, 2001 (JP) .......... 2001-059316

(51) Int. Cl.$^7$ .......... C08J 11/04
(52) U.S. Cl. .......... 521/48; 521/48.5
(58) Field of Search .......... 521/48, 43.5, 44; 525/44; 528/307, 308.3

(56) References Cited

U.S. PATENT DOCUMENTS

| | | |
|---|---|---|
| 3,951,886 A | 4/1976 | Miyake et al. |
| 4,426,478 A | 1/1984 | Noyes et al. |
| 5,252,615 A | 10/1993 | Rao et al. |
| 5,552,478 A * | 9/1996 | Fisher .......... 525/41 |
| 5,726,277 A * | 3/1998 | Salsman .......... 528/272 |
| 6,353,036 B1 * | 3/2002 | Yasumura et al. .......... 521/48 |
| 6,429,233 B1 * | 8/2002 | Oguri et al. .......... 521/48.5 |
| 2002/0177636 A1 * | 11/2002 | Kawamura et al. .......... 523/501 |

FOREIGN PATENT DOCUMENTS

| | | |
|---|---|---|
| CA | 2087914 | 7/1993 |
| JP | 50-61431 | 5/1975 |
| JP | 11-228733 | 8/1999 |
| JP | 2000-191766 | 7/2000 |
| JP | 2001-001655 | 1/2001 |
| WO | 99/51431 | 10/1999 |
| WO | 01/16208 | 3/2001 |
| WO | 01/62823 | 8/2001 |

* cited by examiner

Primary Examiner—Katarzyna Wyrozebski
(74) Attorney, Agent, or Firm—Wenderoth, Lind & Ponack, LLP

(57) ABSTRACT

This invention discloses a process for producing a polyester resin, which is transparent, substantially free of occurrence of foreign matters or filtration residue, and is subject to no problem in physical properties, within short time, by concurrently reacting polyester whose chief starting material is terephthalic acid and which has been recovered from waste materials and regenerated; a polyhydric alcohol component and a polybasic acid component, at such ratios that the regenerated polyester occupies 10–80% by weight based on the total weight of the regenerated polyester, polyhydric alcohol component and polybasic acid component.

8 Claims, No Drawings

PROCESS FOR PRODUCING POLYESTER RESIN

This invention relates to a novel process for producing polyester resin using regenerated polyester which has been recovered from waste materials such as disused PET (polyethylene terephthalate) bottles, and also to paint compositions containing the polyester resin prepared by said process.

Disposal of wastes has been recently causing serious problems, and "3R's" (Recycle, Reduce and Reuse) are recommended. In particular, recycling of disused PET bottles is being promoted, led by the Council for PET Bottle Recycling in Japan Aided by the complete enactment of Containers and Packagings Recycling Act in April, 2000, the recovery ratio of disused PET bottles has been steadily increasing. Under the circumstances, it is essential to enlarge utility of the recovered and regenerated polyester (recycled polyester).

For example, U.S. Pat. No. 5,252,615, EP-A-558,905 and EP-A-558,906 disclose a process for producing intended polyester resin, which comprises subjecting a polyhydric alcohol component and regenerated PET to a depolymerization reaction in the presence of a catalyst to reduce the molecular weight of the PET, and adding a polybasic acid component to the system to carry out a polycondensation reaction. Those publications also teach that the resulting polyester resin is useful for both water-based and non-water-based coating compositions. However, the same process requires many hours for the depolymerization reaction of polyhydric alcohol component with regenerated PET, and the production costs are high compared to conventional processes which do not use regenerated polyester.

The Official Gazette of Hei 11 (1999)-228733A-JP discloses a process for synthesizing polyester resin through ester-interchange reaction of recycled polyester such as regenerated PET with a polyester oligomer having a molecular weight not higher than 5,000. However, this process is subject to a number of problems that it requires an extra step of advance synthesis of said polyester oligomer; its depolymerization step requires many hours because sufficient depolymerization of recycled polyester is difficult due to insufficient amount of alcohol component in the depolymerization system and also because it is a reaction between high molecular weight compounds; and the filtration residue is apt to form in large quantities.

Furthermore, Hei 8 (1996)-253596A-JP discloses a production process of binding resin for toners which comprises the two steps of adding recycled polyester such as regenerated PET to the reaction system to carry out the polymerization while depolymerizing the recycled polyester in the presence of alcohol and if necessary, water; and then of adding an acid component to carry out addition reaction and increasing the molecular weight of the product. According to this process, the first step is a reaction in the system in which a large excess (at least approximately twice) of hydroxyl groups to carboxyl groups are present, and depolymerization of recycled polyester predominantly takes place. Hence the polyester formed in the first step has a low molecular weight, and in the second step an acid component is blended to carry out the addition and polymerization reaction. Thus, the process does not enable effective one-step synthesis of high molecular weight polyester resin. The process attempts to synthesize relatively low molecular weight polyester in the first step and to increase its molecular weight in the second step by adding an acid component. Whereas, the process uses, as the acid component to be added in the second step, tri- or higher functional acid in large quantities to form branched polymers, which involve a problem that they are apt to be gentled as their molecular weight increases.

The main object of the present invention is to provide a process for producing within a short time a high molecular weight polyester resin free of any problem in respect of physical properties, which is transparent and substantially free of formation of foreign matters or filtration residues, from the polyester resin recovered from waste materials and regenerated.

We have engaged in concentrative studies with the view to accomplish the above object, and now discovered that the object can be met by concurrently reacting the polyester resin made chiefly from terephthalic acid, which has been recovered from waste materials and regenerated, with an alcoholic component and an acid component. The present invention has thus been completed.

Accordingly, therefore, the present invention provides a process for producing a polyester resin having a resin acid value not higher than 120 mg KOH/g, hydroxyl value not higher than 120 mg KOH/g and a number-average molecular weight within a range of 2,000–30,000, the process being characterized by concurrently reacting a polyester whose chief starting material is terephthalic acid and which has been recovered from waste materials and regenerated, a polyhydric alcohol component and polybasic acid component, at such ratios that the regenerated polyester occupies 10–80% by weight, based on the total weight of said regenerated polyester, polyhydric alcohol component and polybasic acid component.

The invention furthermore provides paint compositions which contain the polyester resin produced by the above-described production process.

Hereinafter the invention is explained in further details. Those polyester resins made chiefly from terephthalic acid, which have been recovered from waste materials and regenerated, and which are used in the process of this invention (hereafter the polyester resins may be abbreviated as "regenerated PES") include polyethylene terephthalate (e.g., PET bottles) which are recovered for recycling of sources, industrial waste polyethylene terephthalate, and polyester resins regenerated from the wastes occurring in the course of production of polyester products (film, fibers, etc.) made chiefly from terephthalic acid. In particular, recycled polyethylene terephthalate and recycled polybutylene terephthalate are suitable. The regenerated PES is normally used in the form of chips or crushed pieces.

According to the process of the present invention, such regenerated PES, polyhydric alcohol component and polybasic acid component are concurrently reacted, if necessary in the presence of a depolymerization catalyst.

As said polyhydric alcohol component, those that are normally used as alcohol component for constituting polyester resins can be similarly used, examples of which including dihydric alcohols such as ethylene glycol, diethylene glycol triethylene glycol propylene glycol, 1,3-propanediol 2-methyl-1,3-propanediol 2,2-diethyl-1,3-propanediol, 2-butyl-2-diethyl-1,3-propanediol, neopentyl glycol, 1,4-butanediol, 1,5-pentanediol, 1,6-hexanediol and 1,4-dimethylolcyclohexane; trihydric alcohols such as trimethylolpropane, trimethylolethane and glycerine; and tetra- and higher hydric alcohols such as diglycerine, triglycerine, pentaerythritol, dipentaerythritol and sorbitol. Of those, glycerine, trimethylolpropane, ethylene glycol, neopentyl glycol and 1,4-dimethylolcyclohexane are preferred in view of their depolymerizing ability and solubility.

As the polybasic acid component, any of those normally used as the acid component forming polyester resin can similarly be used, examples of which including dibasic acids such as phthalic anhydride, isophthalic acid, terephthalic acid, tetrahydrophthalic anhydride, hexahydrophthalic anhydride, 1,4-cyclohexanedicarboxylic acid, 1,3-cyclohexanedicarboxylic acid, naphthalenedicarboxylic acid, 4,4'-biphenyldicarboxylic acid, diphenylmethane-4,4'-dicarboxylic acid, succinic acid, fumaric acid, adipic acid, sebacic acid and maleic anhydride; tri- and higher polybasic acids such as trimellitic anhydride, pyromellitic anhydride, trimesic acid and methylcyclohexene-tri-carboxylic acid; and $C_1$–$C_6$ alkyl esters of those dibasic acids and tri- and higher polybasic acids. Of those, dibasic acids and their $C_1$–$C_6$ alkyl esters are preferred.

According to the process of the present invention, above-described regenerated PES, polyhydric alcohol component and polybasic acid component are combined and reacted simultaneously. In that occasion, the three components are used at such quantitative ratios that the amount of the regenerated PES is within the range of, based on the total weight of said three components, 10–80%, preferably 20–70%, inter alia, 30–60% by weight, and that the polyester resin obtained according to the process of the invention has a resin acid value not more than 120 mg KOH/g, preferably within a range of 1–80 mg KOH/g, and the hydroxyl value, not more than 120 mg KOH/g, preferably 1–80 mg KOH/g. In particular, it is desirable to use the polybasic acid component and polyhydric alcohol component at such ratios that the equivalent ratio of COOH/OH be within the range of 0.75–1.33, preferably 0.80–1.25.

According to the process of the invention, depolymerization of the regenerated PES and the esterification simultaneously take place to form polyester resin. The term, "esterification reaction" as used herein includes not only ordinary esterification reaction but also ester interchange reaction. While the depolymerization progresses in the absence of catalyst at reaction temperatures higher than the melting point of regenerated PES (at about 240° C. and above), use of a depolymerization catalyst is preferred to carry out the depolymerization at temperatures lower than the melting point or to perform it more effectively.

Examples of depolymerization catalyst include monobutyltin hydroxide, dibutyltin oxide, monobutyltin-2-ethyl hexanoate, dibutyltin dilaurate, stannous oxide, tin acetate, zinc acetate, manganese acetate, cobalt acetate, calcium acetate, lead acetate, litharge, antimony trioxide, tetrabutyl titanate and tetraisopropyl titanate. The use rate of the depolymerization catalyst is not critical, while generally it is preferred to be not more than 10 parts, in particular, within a range of 0.001–5 parts by weight, per 100 parts by weight of the total sum of the regenerated PES, polyhydric alcohol and polybasic acid. Normally the depolymerization catalyst can also serve as esterification (polymerization) catalyst.

The process of the present invention comprises the reaction of above-described regenerated PES, polyhydric alcohol component and polybasic acid component all in one system, in the optional presence of a depolymerization catalyst, in which the depolymerization reaction of the regenerated PES and the esterification reaction (including ester-interchange reaction) among the regenerated PES, polyhydric alcohol component and polybasic acid component progress concurrently to produce the intended polyester resin. The reaction conditions are not critical so long as said depolymerization reaction and the esterification reaction progress simultaneously. Whereas, generally the intended polyester resin can be produced by mixing the three components and reacting them under stirring at about 160—about 270° C., preferably at about 180—about 250° C., for about 2–10 hours. When the polyhydric alcohol component used in the reaction is in solid form, it is preferably heated in advance and melted. After termination of the reaction, so synthesized polyester resin is normally cooled and isolated from the reaction mixture as it is, or for improving its filterability and handling property, may be diluted with an organic solvent and recovered. The kind of useful organic solvent used in that occasion is subject to no limitation so long as it can dissolve the polyester resin.

According to the above-described process of the present invention, an advantage of drastic reduction in reaction time is attained, by the concurrent reaction of regenerated PES, a polyhydric alcohol component and polybasic acid component.

Thus produced polyester resin has a resin acid value not higher than 120 mg KOH/g, preferably 1–80 mg KOH/g; a hydroxyl value not higher than 120 mg KOH/g, preferably 1–80 mg KOH/g; and a number-average molecular weight within a range of 2,000–30,000, preferably 2,500–20,000. In particular, the polyester resin having a resin acid value of 2–80 mg KOH/g, a hydroxyl value of 2–80 mg KOH/g and a number-average molecular weight of 2,500–10,000 is preferred. Furthermore, the chloroform-insoluble component of the produced polyester resin is preferably not more than 1.0%, i.e., that the regenerated PES has been sufficiently decomposed and the formed polyester has a uniform composition, because such a polyester resin gives favorable appearance to painted film when it is incorporated in paint.

Those polyester resins produced according to the process of the present invention are useful as the resin binder in paint compositions, and when they have a glass transition temperature not lower than about 30° C., they are also useful as the resin binder for powder coating compositions.

When the polyester resins obtained according to the process of the present invention contain hydroxyl groups, they can be conveniently used as resins for thermosetting paint, in combination with a curing agent which is reactive with hydroxyl groups, e.g., an amino resin such as melamine resin, polyisocyanate compound, epoxy compound and the like. On the other hand, when the polyester resins contain carboxyl groups, they can be conveniently used as resins for thermosetting paint, in combination with a curing agent which is reactive with carboxyl groups, such as an epoxy compound.

For formulating a paint composition using a polyester resin obtained according to the process of the invention, known paint additives such as organic pigment, inorganic pigment, filler, curing catalyst, surface control agent (anti-cissing agent), flow-and-leveling agent, ultraviolet absorber, ultraviolet stabilizer, organic solvent and the like may be added if necessary, besides the polyester resin and a curing agent as above-described. When the polyester resin has a glass transition temperature not lower than 30° C., it can be conveniently used as a resin for powder coating composition. For preparing such a powder coating composition, practices known per se for formulating powder coating compositions can be followed, e.g., by combining the polyester resin, a curing agent and other paint additives if necessary, dry-blending them in a mixer, heat-melting, kneading, cooling, coarse crushing, finely pulverizing and classifying, a powder coating composition can be prepared.

The paint composition in which the polyester resin obtained by the process of the present invention is used can form cured baked film upon being applied onto an object matter and baked. The baking conditions are not critical and can be suitably chosen so long as the applied paint can be cured thereunder. Normally, when baking temperature of about 120—about 210° C. is used, the baking time is around 5–30 minutes, and where the baking temperature conditions under which the maximum temperature of the object matter reaches about 180—about 250° C., preferred baking time is less than 5 minutes.

Hereinafter the invention is more specifically explained with reference to Examples in which parts and percentages are by weight.

EXAMPLE 1

A reactor equipped with a thermometer, stirrer, heater and a rectification column was charged with 299 parts of neopentyl glycol and 41 parts of trimethylolpropane, which were heated to 130° C. under stirring until the whole system turned to a transparent liquid. Then 1.0 part of monobutyltin oxide, 448 parts of isophthalic acid and 547 parts of recycled polyethylene terephthalate (regenerated PET) were charged and heated to 180° C. Then the temperature of the content was gradually raised from 180° C. to 240° C. over 3 hours, and the reaction was continued at 240° C. for further 30 minutes. Then the rectification column was replaced with a water separator, and approximately 50 parts of xylene was added to the reaction mixture. Xylene was poured also into the water separator, and condensed water was removed through azeotropic distillation of water and xylene. Thirty (30) minutes after the addition of xylene, the acid value measurement was started and two hours after the addition of xylene, heating was stopped upon confirming that the acid value was less than 5.0. Removing the xylene under reduced pressure, a polyester resin-1 was obtained as 100% solid content. The production time of said polyester resin from the initiation to suspension of the heating for reaction was about 6.5 hours.

EXAMPLES 2–4

Example 1 was repeated except that the blended composition was varied for each run as shown in later given Table 1, to provide polyester resins.

EXAMPLE 5

A reactor similar to the one used in Example 1 was charged with 299 parts of neopentyl glycol and 41 parts of trimethylolpropane, which was then heated to 130° C. under stirring. When the system turned to a transparent liquid, 1.0 part of monobutyltin oxide, 647 parts of isophthalic acid and 547 parts of regenerated PET were added thereto, and heated to 180° C. The temperature of the system was then gradually raised from 180° C. to 240° C. over 3 hours, and the reaction was continued for further 3 hours at 240° C., while measuring the acid value. The reaction was then stopped after confirming that the acid value was less than 53.0. Removing the water in the system by reduced pressure distillation, a polyester resin-5 was obtained as 100% heating residue. The production time of the polyester resin was about 7.0 hours, from the initiation to suspension of the heating for the reaction.

EXAMPLE 6

Example 1 was repeated except that said 1.0 part of monobutyltin oxide was replaced with 1.0 part of litharge, to produce a polyester resin-6. The production time of said polyester resin was about 7.5 hours, from the initiation to suspension of the heating for the reaction.

EXAMPLE 7

Example 1 was repeated except that the use of 1.0 part of monobutyltin oxide was omitted and that the gradual temperature rise from 180° C. to 250° C. was effected over the period of 3 hours. The subsequent reaction was continued at 250° C. Thus a polyester resin-7 was obtained. The production time of said polyester resin was about 8.5 hours, from the initiation to suspension of the heating for the reaction.

Comparative Example 1

A reactor similar to the one used in Example 1 was charged with 299 parts of neopentyl glycol and 41 parts of trimethylolpropane, which were heated to 130° C. under stirring. After the system was converted to a transparent liquid, 1.0 part of monobutyltin oxide and 547 parts of regenerated PET were charged and heated to 190° C. Thereafter the temperature of the system was gradually raised, to an extent that the temperature at the upper portion of the rectification column does not exceed 100° C. Thus consuming about 6 hours until the content became transparent, the regenerated PET was reacted (including alcoholysis and ester-interchange reaction).

Thereafter the system in the reactor was cooled to 180° C., to which 448 parts of isophthalic acid was added and together gradually heated to 240° C. over a period of 3 hours. The reaction was continued for further 30 minutes at 240° C., and the rectification column was replaced with a water separator. About 50 parts of xylene was added to the system, and xylene was fed also into the water separator. The condensed water was removed through azeotropic distillation of water and xylene. After 1 hour from the addition of xylene, the acid value measurement was started, and 3.5 hours after the addition of xylene the acid value was confirmed to be less than 5.0. Whereupon the heating was stopped and xylene was removed under reduced pressure, to provide a polyester resin-8 whose 99.8% was the heating residue. The production time of said polyester resin was about 16 hours, from the initiation to suspension of the heating for the reaction.

Comparative Example 2

Example 5 was repeated except that the blended composition was changed as shown in later appearing Table 1, and that the reaction was continued for 5 hours after the temperature was raised to 230° C., while measuring the acid value. Thus a polyester resin-9 was obtained, in which white powder which presumably was attributable to sublimation of the acid component remained, and a transparent, homogeneous polyester resin was not formed.

The acid value, hydroxyl value and number-average molecular weight of each of the resins obtained in Examples 1–7 and Comparative Examples 1–2 were as shown in the following Table 1. The blended amounts as given in Table 1 are in terms of part by weight.

TABLE 1

|  | Example | | | | |
| --- | --- | --- | --- | --- | --- |
|  | 1 | 2 | 3 | 4 | 5 |
| Polyester resin | polyester-resin-1 | polyester-resin-2 | polyester-resin-3 | polyester-resin-4 | polyester-resin-5 |
| neopentyl glycol | 299 | 299 | 158 | 110 | 299 |
| 1,6-hexanediol |  |  |  | 212 |  |
| trimethylolpropane | 41 | 41 | 41 | 41 | 41 |
| ethylene glycol |  | 93 |  |  |  |
| isophthalic acid | 448 | 448 | 224 | 149 | 647 |

TABLE 1-continued

| | | | | | |
|---|---|---|---|---|---|
| terephthalic acid | | 249 | | | |
| adipic acid | | | | 263 | |
| regenerated PET | 547 | 259 | 806 | 547 | 547 |
| monobutyltin oxide | 1.0 | 1.0 | 1.0 | 1.0 | 1.0 |
| reaction time (hrs.) | 6.5 | 7.5 | 6.5 | 6.5 | 7.0 |
| blended ratio of regenerated PET (%) | 41 | 21 | 68 | 45 | 39 |
| resin acid value (mg KOH/g) | 4.8 | 4.9 | 4.7 | 4.8 | 52.5 |
| hydroxyl value (mg KOH/g) | 59 | 59 | 62 | 60 | 0 |
| glass transition point (° C.) | 55 | 54 | 60 | −18 | 60 |
| number-average molecular weight | 6600 | 6000 | 7000 | 6600 | 6100 |

| | Example | | Comparative Example | |
|---|---|---|---|---|
| | 6 | 7 | 1 | 2 |
| Polyester resin | polyester-resin-6 | polyester-resin-7 | polyester-resin-8 | polyester-resin-9 |
| neopentyl glycol | 299 | 299 | 299 | 299 |
| 1,6-hexanediol | | | | |
| trimethylolpropane | 41 | 41 | 41 | 41 |
| ethylene glycol | | | | |
| isophthalic acid | 448 | 448 | 448 | 896 |
| terephthalic acid | | | | |
| adipic acid | | | | |
| regenerated PET | 547 | 547 | 547 | 547 |
| monobutyltin oxide | | | 1.0 | 1.0 |
| litharge | 1.0 | | | |
| reaction time (hrs.) | 7.5 | 8.5 | 16.0 | 9.0 |
| blended ratio of regenerated PET (%) | 41 | 41 | 41 | 33 |
| resin acid value (mg KOH/g) | 4.9 | 4.7 | 4.8 | 160 |
| hydroxyl value (mg KOH/g) | 59 | 59 | 59 | 0 |
| glass transition point (° C.) | 55 | 55 | 55 | 60 |
| number-average molecular weight | 6600 | 6600 | 6600 | 2500 |

EXAMPLE 8

One-hundred (100) parts of polyester resin-1 as obtained in Example 1, 30 parts of VESTAGON™ B-1530 (Hüls AG, Germany, ε-caprolactum-blocked triisocyanurate of isophoronediisocyanate; solid content, 100%), 0.1 part of TAKENATE™ TK-1 (Takeda Chemical Industries, Ltd., an organotin-derived curing catalyst), 50 parts of TITANIX™ JR-605 (Tayca Corporation, a titanium white pigment), 1.0 part of POLYFLOW-S™ (Kyoeisha Chemical Co., Ltd., a surface control agent) and 0.4 part of benzoin were dry-blended in Henschel mixer, heat-melted and kneaded in a twin screw extruder, cooled, coarsely crushed, finely pulverized with an atomizer and classified, to provide a thermosetting powder coating composition.

EXAMPLES 9–13 AND COMPARATIVE EXAMPLE 3

Example 8 was repeated except that the blended composition was varied for each run as indicated in later appearing Table 2, to provide thermosetting powder coating compositions.

In said Table 2, the notes denote the following, respectively.

(*1) Epikote™ #1003:
  Shell Chemicals, Co., a bisphenol A-type epoxy resin
(*2) Curezol™ 2E4MZ:
  Shikoku Chemicals Corporation, an imidazole-derived curing catalyst

EXAMPLE 14

One-hundred (100) parts of polyester resin-4, which was obtained in Example 4, were dissolved in 100 parts of a mixed solvent *1), and the solution was mixed and stirred with 30 parts of VESTAGON™ B-1530, 0.1 part of TAKENATE™ TK-1, 50 parts of TITANIX JR-605, 1.0 part of POLYFLOW-S and 0.4 part of benzoin, using Atliter. After adjusting the viscosity of the resulting blend with said mixed solvent to 100 seconds (Ford Cup #4/25° C.), the blend was filtered to provide a solvent type thermosetting paint.

*1) mixed solvent: SWASOL™ 1500 (Cosmo Oil Co., Ltd., high-boiling hydrocarbon solvent)/cyclohexanone=50/50 (weight ratio) solvent mixture Preparation of Test Panels Each of the thermosetting powder coating compositions as prepared in Examples 8–13 and Comparative Example 3 were applied onto zinc phosphate-treated sheet steel by electrostatic powder coating process, to a cured coating thickness of about 60 μm, and baked at 180° C. for 20 minutes to provide the test panels.

Also the solvent type thermosetting paint, which was prepared in Example 14, was applied onto a zinc phosphate-treated sheet steel with a bar coater, to a cured film thickness of about 60 μm and baked at 180° C. for 20 minutes to provide a test panel.

Those panels were evaluated in respect of the appearance of the baked film, 60° mirror surface gloss, impact resistance and given Erichsen test, according to the following methods. The results were as given in the later appearing Table 2.

Test Methods

Painted Film Appearance

The finish of the baked surface of each test panel was visually observed and evaluated according to the following standard;

○: good △: inferior X: poor.

60° Mirror Surface Gloss

Following JIS K-5400 7.6 (1990) 60° Mirror Surface Gloss, the gloss level of each baked film was determined by measuring its reflectivity when both incident angle and acceptance angle were 60°, and expressing the result in percent to the gloss (100) of the standard mirror surface.

Impact Resistance

Each test panel was allowed to stand in 20° C. atmosphere for about 24 hours, and then in the same 20° C. atmosphere placed on the cradle of DuPont Impact Tester, with its painted surface on the top. A shock mould with semi-spherical front of about 6.35 mm in radius was placed on the baked surface and onto the hitting core a 500 g weight was dropped. The impact resistance of the painted surface was judged by the height (cm) from which said weight was dropped, when the depression formed in the test specimen by the impact and the peripheral portion thereof started to crack. When no crack was caused by the weight dropping from the height of 50 cm, the impact resistance was indicated as 50<.

Erichsen Test

Using Erichsen tester, each test panel was pushed from the side opposite to the painted surface, and the height (mm) of the pushed out portion at which cracks appeared in the baked film was recorded. When no crack was formed in the baked film at the pushed out height of 7 mm, the result was indicated as 7<.

TABLE 2

|  |  | Example | | | | | | | Comparative Example |
|---|---|---|---|---|---|---|---|---|---|
|  |  | 8 | 9 | 10 | 11 | 12 | 13 | 14 | 3 |
|  |  |  |  |  | Example |  |  |  | Comparative |
| Polyester-resin | Kind (Example No.) | 1 | 2 | 3 | 5 | 6 | 7 | 4 | Example 1 |
|  | Amount (part) | 100 | 100 | 100 | 70 | 100 | 100 | 100 | 100 |
| VESTAGON B-1530 |  | 30 | 30 | 30 |  | 30 | 30 | 30 | 30 |
| EPIKOTE #1003(*1) |  |  |  |  | 30 |  |  |  |  |
| TAKENATE TK-1 |  | 0.1 | 0.1 | 0.1 |  | 0.1 | 0.1 | 0.1 | 0.1 |
| CUREZOL 2E4MZ(*2) |  |  |  |  | 0.3 |  |  |  |  |
| TITANIX JR-605 |  | 50 | 50 | 50 | 50 | 50 | 50 | 50 | 50 |
| POLYFLOW-S |  | 1.0 | 1.0 | 1.0 | 1.0 | 1.0 | 1.0 | 1.0 | 1.0 |
| Benzoin |  | 0.4 | 0.4 | 0.4 | 0.4 | 0.4 | 0.4 | 0.4 | 0.4 |
| Test Result | Appearance of baked film | ○ | ○ | ○ | ○ | ○ | ○ | ○ | ○ |
|  | 60° Mirror surface gloss | 96 | 95 | 94 | 92 | 94 | 93 | 95 | 95 |
|  | Impact resistance | 50< | 50< | 50< | 50< | 50< | 50< | 50< | 50< |
|  | Erichsen film test | 7< | 7< | 7< | 7< | 7< | 7< | 7< | 7< |

According to the above-described process of the present invention, polyester resin which is transparent, substantially free of occurrence of foreign matters or filtration residue as well as of any problem in physical property can be produced within short time, using polyester resin recovered from waste materials. The process of the invention enables utilization of disused PET bottles and the like for recycling, as it uses waste matter as one of the starting materials.

The polyester resin obtained according to the process of the present invention, furthermore, can be conveniently used as a resin for thermosetting paint, in combination with curing agent.

What is claimed is:

1. A process for producing a polyester resin having a resin acid value not higher than 120 mg KOH/g, a hydroxyl value not higher than 120 mg KOH/g and a number-average molecular weight within a range of 2,000–30,000, the process comprising concurrently reacting (1) a polyester whose chief starting material is terephthalic acid and which has been recovered from waste materials and regenerated, (2) a polyhydric alcohol component and (3) a polybasic acid component, at such ratios that the regenerated polyester occupies 10–80% by weight, based on the total weight of said regenerated polyester, the polyhydric alcohol component and the polybasic acid component.

2. A process according to claim 1, in which said polyester whose chief starting materials is terephthalic acid and which has been recovered from waste materials and regenerated is recycled polyethylene terephthalate.

3. A process according to claim 1, in which the polyhydric alcohol component is selected from a group consisting of glycerine, trimethylolpropane, ethylene glycol, neopentyl glycol and 1,4-dimethylolcyclohexane.

4. A process according to claim 1, in which the polybasic acid component is a dibasic acid or a $C_1$–$C_6$ alkyl ester thereof.

5. A process according to claim 1, in which the reaction is carried out at such ratios that the regenerated polyester occupies 20–70% by weight, based on the total weight of said regenerated polyester, the polyhydric alcohol component and the polybasic acid component.

6. A process according to claim 1, in which the reaction is carried out in the presence of a depolymerization catalyst.

7. A process according to claim 1, in which the produced polyester resin has a resin acid value within a range of 2–80 mg KOH/g, a hydroxyl value within a range of 2–80 mg KOH/g and a number-average molecular weight within a range of 2,500–10,000.

8. A process according to claim 1, in which the chloroform-insoluble component of the produced polyester resin is not more than 1.0%.

* * * * *